United States Patent
Royyuru et al.

(10) Patent No.: US 10,354,321 B2
(45) Date of Patent: Jul. 16, 2019

(54) PROCESSING TRANSACTIONS WITH AN EXTENDED APPLICATION ID AND DYNAMIC CRYPTOGRAMS

(75) Inventors: Vijay K. Royyuru, Norristown, PA (US); Robert P. Klotz, Lafayette Hill, PA (US); John Fullett, Atlanta, GA (US); Nancy Loomis, San Diego, CA (US)

(73) Assignee: First Data Corporation, Greenwood Village, CO (US)

( * ) Notice: Subject to any disclaimer, the term of this patent is extended or adjusted under 35 U.S.C. 154(b) by 778 days.

(21) Appl. No.: 13/493,316

(22) Filed: Jun. 11, 2012

(65) Prior Publication Data
US 2012/0317035 A1    Dec. 13, 2012

Related U.S. Application Data

(63) Continuation-in-part of application No. 12/357,579, filed on Jan. 22, 2009, now Pat. No. 10,037,524.

(51) Int. Cl.
*G06Q 40/02* (2012.01)
*G06Q 20/04* (2012.01)
(Continued)

(52) U.S. Cl.
CPC .............. *G06Q 40/02* (2013.01); *G06Q 20/04* (2013.01); *G06Q 20/204* (2013.01);
(Continued)

(58) Field of Classification Search
CPC ................................................ G06Q 20/3572
(Continued)

(56) References Cited

U.S. PATENT DOCUMENTS

| | | |
|---|---|---|
| 5,585,787 A | 12/1996 | Wallerstein |
| 5,913,203 A | 6/1999 | Wong et al. |

(Continued)

OTHER PUBLICATIONS

Stiles, H., "Credit Card Validation—Check Digits," 1997, [retieved on Sep. 12, 2011], 2 pages. Retrieved from: http://www.beachnet.com/~hstiles/cardtype.html.

*Primary Examiner* — Chinedu C Agwumezie
(74) *Attorney, Agent, or Firm* — Kilpatrick Townsend & Stockton LLP

(57) ABSTRACT

Methods, systems, and machine-readable media are disclosed for handling information related to a transaction conducted with a presentation instrument at a POS device. Extended application IDs and dynamic cryptograms are used for the transaction. According to one embodiment, a method of processing a financial transaction for an account having a primary account number (PAN) can comprise detecting initiation of the transaction with the presentation instrument, and providing from the presentation instrument to the POS device a list of one or more applications IDs. Each application ID identifies an application that can be used to communicate data concerning the transaction between the presentation instrument and the POS device. The POS device selects one of the application IDs and returns it to the presentation instrument. Under the control of the selected application, the presentation instrument generates a Dynamic Transaction Cryptogram (DTC) and a dynamic PAN that are each valid for only a single transaction.

20 Claims, 8 Drawing Sheets

(51) Int. Cl.
*G06Q 20/34* (2012.01)
*G06Q 20/36* (2012.01)
*G06Q 20/38* (2012.01)
*G06Q 30/06* (2012.01)
*H04L 9/08* (2006.01)
*G06Q 20/20* (2012.01)

(52) U.S. Cl.
CPC ......... *G06Q 20/341* (2013.01); *G06Q 20/352* (2013.01); *G06Q 20/3574* (2013.01); *G06Q 20/3674* (2013.01); *G06Q 20/382* (2013.01); *G06Q 20/385* (2013.01); *G06Q 30/06* (2013.01); *H04L 9/0861* (2013.01); *H04L 2209/56* (2013.01)

(58) Field of Classification Search
USPC .......................................................... 705/71
See application file for complete search history.

(56) References Cited

U.S. PATENT DOCUMENTS

| | | |
|---|---|---|
| 5,937,394 A | 8/1999 | Wong et al. |
| 5,955,961 A | 9/1999 | Wallerstein |
| 5,956,699 A | 9/1999 | Wong et al. |
| 6,163,771 A | 12/2000 | Walker et al. |
| 6,592,044 B1 | 7/2003 | Wong et al. |
| 6,607,127 B2 | 8/2003 | Wong |
| 6,609,654 B1 | 8/2003 | Anderson et al. |
| 6,755,341 B1 | 6/2004 | Wong et al. |
| 6,805,288 B2 | 10/2004 | Routherstein et al. |
| 6,811,082 B2 | 11/2004 | Wong |
| 7,044,394 B2 | 5/2006 | Brown |
| 7,195,154 B2 | 3/2007 | Routherstein |
| 7,246,752 B2 | 7/2007 | Brown |
| 7,352,996 B2 * | 4/2008 | Kumar .................... G06F 21/35 340/5.1 |
| 7,472,829 B2 | 1/2009 | Brown |
| 7,580,898 B2 * | 8/2009 | Brown ................ G06Q 20/341 705/50 |
| 7,584,153 B2 | 9/2009 | Brown et al. |
| 2003/0080183 A1 | 5/2003 | Rajasekaran et al. |
| 2004/0177045 A1 | 9/2004 | Brown |
| 2006/0249574 A1 | 11/2006 | Brown et al. |
| 2007/0136211 A1 | 6/2007 | Brown et al. |
| 2007/0208671 A1 | 9/2007 | Brown et al. |
| 2007/0241201 A1 | 10/2007 | Brown et al. |
| 2009/0006262 A1 | 1/2009 | Brown et al. |
| 2009/0070260 A1 | 3/2009 | Flitcroft et al. |
| 2010/0185545 A1 | 7/2010 | Royyuru et al. |
| 2012/0174189 A1 * | 7/2012 | Lim ...................... H04L 63/067 726/3 |
| 2013/0282474 A1 * | 10/2013 | Postrel ................ G06Q 20/105 705/14.38 |

* cited by examiner

| Application Provider ID | Application Code | Issuer Code | Account Type Code |
|---|---|---|---|
| (5) | (2) | (4) | (5) |

FIG. 8

PROCESSING TRANSACTIONS WITH AN EXTENDED APPLICATION ID AND DYNAMIC CRYPTOGRAMS

CROSS-REFERENCES TO RELATED APPLICATIONS

This application is a continuation-in-part of U.S. patent application Ser. No. 12/357,579, filed Jan. 22, 2009, the complete disclosures of which are incorporated herein by reference.

BACKGROUND OF THE INVENTION

Embodiments of the present invention generally relate to handling information related to financial and other transactions. More specifically, some embodiments of the present invention relate to methods and systems for identifying applications used in communicating data between a presentation instrument and a terminal in order to conduct a financial transaction. Embodiments of the invention further include using a dynamic cryptogram for securely handling the financial transaction.

Today, merchants and service providers accept various forms of payment. Many merchants will accept cash, credit cards, debit cards, stored-value cards, checks, and promotional items such as coupons. Additionally, various forms of wireless or contactless devices have been introduced for use in various types of transactions. For example, contactless transaction initiation is often performed with a "smart" card or other presentation instrument such as a key fob or a mobile device such as a cell phone or Personal Digital Assistant (PDA) containing a memory and a processor. Such a card or device typically also includes Radio-Frequency IDentification ("RFID") or Near-Field Communications (NFC) components for contactless communication with a Point-Of-Sale (POS) device. The information stored in the memory of the device and communicated via the RFID or NFC components to the POS device is generally similar or identical to the information recorded on the magnetic stripe of a card, i.e., account number etc. Thus, in some cases, such devices may be utilized instead of more conventional cards.

However, such devices and/or transactions are vulnerable to a number of different types of attacks from identity thieves or other criminals. For example, devices capable of skimming transmissions between the merchant's reader and cards or other devices can be placed near the NFC reader to read the transaction information, including the account number, when a card or device is read at the POS device, making the transaction particularly vulnerable if the account number is transmitted in clear text (unencrypted) form. In another example, illegal portable readers can be used which, when brought into proximity with a card or other device can read the account information from the card even while it is being carried in a wallet or purse. In yet another example, transactions or transaction information that are transmitted through a payment processor's network or other network may be intercepted and read to obtain account numbers and/or other information.

In an effort to prevent such attacks, encryption is sometimes used to protect the account number on the card or device. Such encryption utilizes an encrypted account number on the card or device or an encryption key that is loaded into the card or device that is derived from an institution level key (i.e., it applies to many cards) and the card number. However, using a common key can lead to a compromise of a large number of cards if the institution's encryption key is exposed. A common defense against this risk is to derive a card level key using the common institution level key and some card level attributes such as the Primary Account Number (PAN), though this technique has exposure risk as well. This key exposure can result from a failure in business processes of the issuer to protect the key or an assault on a single chip, e.g., using electron-microscopy to expose the derived key followed by a DES assault to derive the institution's key. If the institution key is compromised, all transactions for all cards or devices with this institution's key are potentially exposed. Therefore, a new key must be created and a possibly large number of cards re-issued. Hence, there is a need in the art for improved methods and systems for securely handling a financial transaction.

In addition, with the increasing use of mobile devices for conducting transactions, there has been a corresponding increase in the numbers of different payment processors and issuers involved in such transactions. The types of data and the data format for transactions may vary, depending not only on the payment processor, but the issuer and the type of account involved. As one example, for a debit card account, a PIN may need to be part of the data transmitted by the user to authenticate the transactions. For a credit card account, PINs are typically not required. Thus different types of accounts from the same card issuer may require different data to conduct a transaction. As another example, different issuers may have different card data or data formats required by the systems they use for processing a financial transaction. Also, an account number might be useful to establish the type of account (and the nature of the data to be transmitted), but for the reasons given above, an account number being sent in clear text form from a presentation instrument to a reader (to establish the data to be transmitted) involves increased risk.

The establishment of card data formats to be transmitted between the presentation instrument device and terminal reader (e.g., at a POS device) is done by an application resident at both the device and at the POS device. Such applications are sometimes referred to as a "chip" application or a "card" application, since they are stored in memory associated with a processor chip found on a presentation instrument or smart card device. As long as the device and the reader both have the same application, the required data can be transmitted and received in the proper format. During the initial steps of conducting a transaction, a presentation instrument and a reader at a POS device will verify that they each do, in fact, have the same card application. While such applications are identified by an application ID that can distinguish between applications (and the providers of those applications), the increasing numbers of transactions using mobile devices necessitates some further means for distinguishing between applications. As an example, a single provider (e.g., payment processor) may need to have many different applications depending on the issuer (for which it is processing payment) and the many different kinds of accounts maintained by each issuer. Current application IDs do not permit systems to efficiently distinguish between applications.

BRIEF SUMMARY OF THE INVENTION

In some embodiments, methods, systems, and machine-readable media are disclosed for handling information related to a financial transaction including utilizing an expanded application ID for applications that manage the flow of data between a presentation instrument device (e.g., a mobile device used a presentation instrument or financial card) and a terminal/reader (e.g., point-of-sale device) where the transaction is conducted. According to one embodiment, a method is provided for processing a transaction related to an account having an account number, where the transaction is conducted with a device used as a presentation instrument device (PI device) communicating with a point of sale device (POS device). The method can comprise detecting initiation of the transaction with the PI device, and providing from the PI device to the POS device a list of one or more applications IDs, each identifying an application that can be used to communicate data concerning the transaction between the PI device and the POS device. Each application ID includes fields identifying a provider of the application, a code for the application, a code for the issuer of the PI device, and a type for the account. The POS device selects (from among the list of application IDs) an application to be used for the transaction, and provides the application ID for the selected application to the PI device. Communications between the PI device and the POS device are managed using the selected application.

In other embodiments, methods, systems, and machine-readable media are disclosed for handling information related to a financial transaction including utilizing a set of dynamic cryptograms that are valid for a single transaction. According to one embodiment, a method of processing a financial transaction related to a financial account can comprise detecting initiation of the transaction with a device used as a presentation instrument in the transaction. A Dynamic Transaction Cryptogram (DTC) can be generated at the device (e.g., under the control of the application identified by an application ID selected by the POS device), using a unique card level key stored on the device. A dynamic PAN can also be generated at the device. The dynamic PAN can comprise an encrypted form of a real PAN of the financial account that varies with each use of the device. Generating the dynamic PAN can be based on the real PAN and an Institution Key Card Variant (IKCV) stored on the device. The IKCV can be derived from the institution key of the issuer of the account. The dynamic PAN can also be based on an undeterminable number generated or received by the device. Generating the dynamic PAN can further comprise reading the real PAN from a memory of the device, generating Pseudo-PAN-Dynamic-Data (PPDD) representing the real PAN by combining the real PAN with the undeterminable number, and encrypting the PPDD using the card-level key. In some cases, an unencrypted portion of the real PAN (Conserved Real PAN Digits) can be included as part of or appended to the dynamic PAN. For example, Conserved Real Pan Digits can comprise less than all of the real PAN and can include information for routing of the transaction to a financial institution.

The DTC and the dynamic PAN can be provided by the device for use in the transaction. For example, providing the DTC and the dynamic PAN from the device for use in the transaction can comprise providing the DTC and dynamic PAN to a Point-of-Sale (POS) device. In such cases, the DTC and the dynamic PAN can be sent or provided from the POS device to a payment processor system. The real PAN of the financial account can be determined at the payment processor system. The transaction can be authenticated at the payment processor system or at the financial institution based on the DTC. For example, determining the real PAN can comprise decrypting the dynamic PAN using a key maintained by the payment processor system and corresponding to one of the card-level keys of the device (e.g., the, IKCV). The real PAN can be sent from the payment processor system to a financial institution to affect processing of the transaction. Authenticating the transaction at the payment processor can comprise validating the DTC using a key maintained at the DTC validation system (e.g., the payment processor system or the financial institution), corresponding to the unique card level key on the payment device. According to another embodiment, dynamic PAN decryption to real PAN can be done by the payment processor and the DTC authentication can be done by the financial institution.

BRIEF DESCRIPTION OF THE DRAWINGS

FIG. 8 is an illustration of an application ID for an application used by the presentation instrument and POS device seen in FIG. 3, according to on embodiment of the present invention.

DETAILED DESCRIPTION OF THE INVENTION

Figure 1:
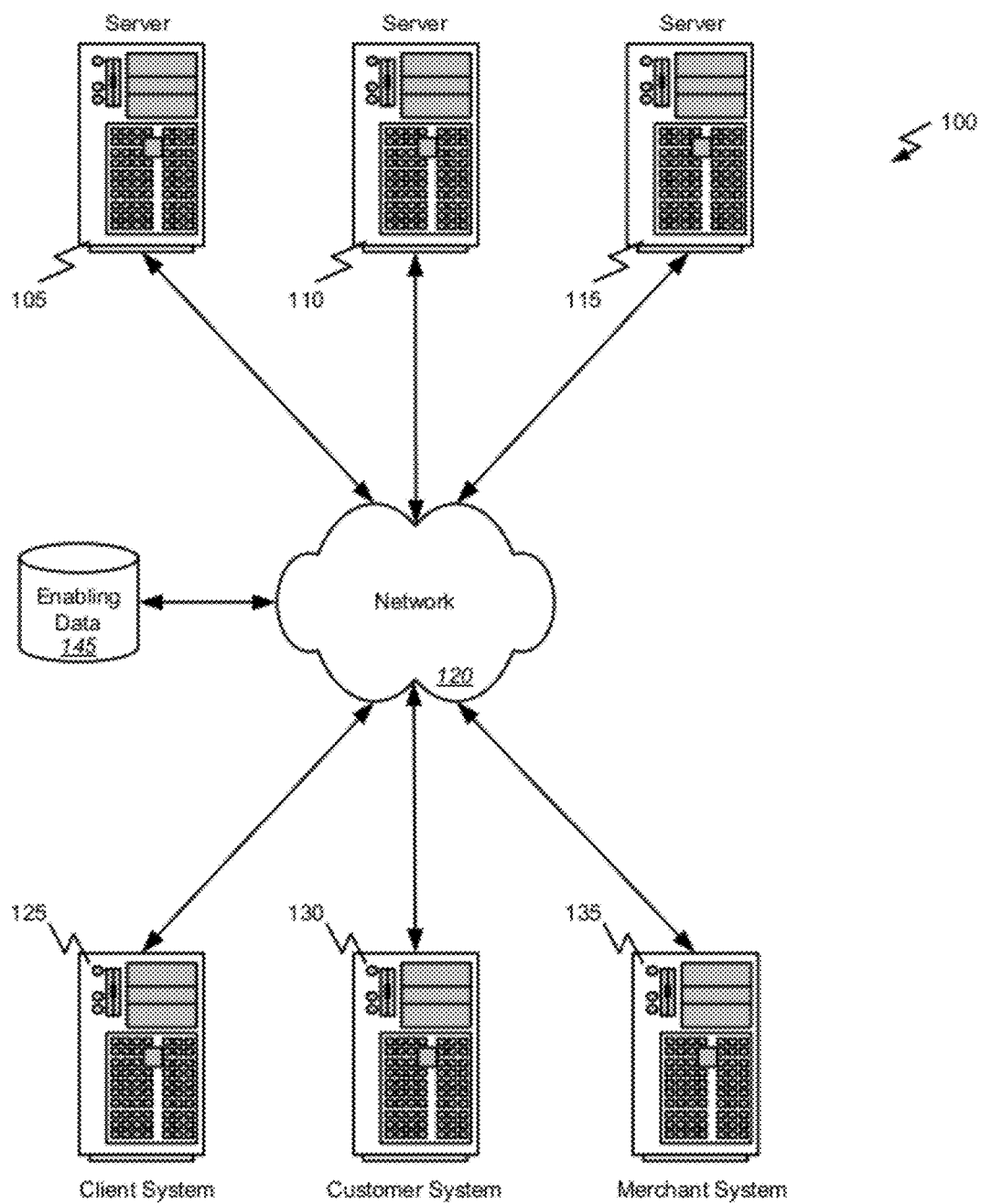
FIG. 1 is a block diagram illustrating an exemplary environment in which embodiments of the present invention may be implemented.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Embodiments of the invention provide methods and systems for processing various financial transactions as well as other information related to one or more financial accounts. In some such embodiments, the processes are executed by an entity on behalf of one or more client organizations. The description herein sometimes refers to "clients" and to "customers." Reference to "clients" is intended to refer to persons, i.e. individuals, entities, or their agents, on whose behalf a set of information is managed. Reference to "customers" or "consumer" is intended to refer to persons, i.e. individuals, entities, or their agents, who are the subject of or related to that information. Thus, merely for purposes of illustration, in the case where the information comprises credit-card account records for a credit card issued to Mr. Jones by Bank A, Bank A corresponds to a client and Mr. Jones corresponds to a customer or consumer.

In describing embodiments of the invention, reference is sometimes made to other terms having specific intended meanings For example, as used herein, the term "payment processor" refers to an entity that receives purchase transaction information from a merchant or other entity and, based on account identifier information, routes the transaction information over an electronic funds transfer network to an issuer of the account being used for payment. In the context of an application used to communicate between a presentation instrument and a POS device, in some embodiments the payment processer may be the "provider" of such an application.

The term "mobile device" is used herein to refer to any small, likely handheld, electronic device that can be used to initiate or otherwise participate in a financial transaction. For example, a mobile device can include, but is not limited to a cellular telephone, a Personal Digital Assistant (PDA), a smart card or other contactless device, etc. Exemplary devices that may be adapted for use as mobile devices in various embodiments of the present invention are described in co-pending and commonly assigned U.S. patent application Ser. No. 11/672,417 entitled "Contactless Electronic Wallet Payment Device" filed on Feb. 7, 2007; U.S. patent application Ser. No. 11/551,063 entitled "Presentation Instrument with Non-Financial Functionality" filed on Oct. 19, 2006; and U.S. Provisional Patent Application No. 60/833,022 entitled "Mobile Payment Device with Magnetic Stripe" filed on Jul. 24, 2006, each of which is incorporated herein by reference in its entirety for all purposes.

"Near Field Communication" (NFC) refers to short range wireless technology used to facilitate communication between electronic devices in close proximity. For example, embodiments of the present invention provide for the use of NFC and/or other relatively short range communications between a mobile device and a POS device such as when a user of the mobile device scans or waves the mobile device in front of or near the POS device when paying for goods or services.

A "payment network" refers herein to an infrastructure that supports that exchange of data in implementing financial transactions. It is anticipated that the data exchange typically proceeds between merchants and financial institutions. Examples of existing commercial networks that are included within the definition of "payment network" include the STAR network, the NYCE® network, the VISA® network, and the MasterCard® network. Access to a network by a consumer can be achieved through entry of a secret code, such as a personal identification number ("PIN"), in combination with data extracted from the mobile device. In some embodiments, a signature of the consumer may be used in lieu of a secret code. In some instances, particularly in support of transactions having a low value, a consumer might be permitted access to the payment network with only information extracted from the mobile device, without the need to provide a PIN or signature.

A "point-of-sale device" or "POS device" refers herein to any physical device situated at a location where a consumer may provide payment in support of a transaction. Such physical locations are typically merchant locations, such as where the POS device is operated by a clerk or is available for self-operation by the consumers (such as a vending machine), but may also be in other locations. For instance, certain automatic teller machines "ATMs" may be equipped to support transactions for the sale of movie or sporting-event tickets even remote from the merchant location; other similar types of transactions that may be performed with a POS device at a location remote from the merchant will also be evident to those of skill in the art. In some cases, a personal computer equipped with the appropriate structure may be used as a POS device even when located on the consumer premises. Examples of POS devices thus include, without limitation, personal computers, cash registers, and any devices capable of reading a magnetic stripe, an RFID chip, NFC communications, or other information from a mobile device, contactless device, card, etc. Exemplary devices that may be adapted for use in various embodiments of the present invention are described in the following commonly assigned applications, the entire disclosures of which are incorporated herein by reference for all purposes: U.S. Provisional Patent Application No. 60/147,889, entitled "Integrated Point of Sale Device," filed Aug. 9, 1999 by Randy J. Templeton et al.; U.S. patent application Ser. No. 09/634,901, entitled "Point of Sale Payment System," filed Aug. 9, 2000 by Randy J. Templeton et al.; U.S. patent application Ser. No. 10/116,689, entitled "Systems and Methods for Performing Transactions at a Point-of-Sale," filed Apr. 3, 2002 by Earney Stoutenburg et al.; U.S. patent application Ser. No. 10/116,733, entitled "Systems and Methods for Deploying a Point-of-Sale System," filed Apr. 3, 2002 by Earney Stoutenburg et al.; U.S. patent application Ser. No. 10/116,686, entitled "Systems and Methods for Utilizing A Point-of-Sale System," filed Apr. 3, 2002 by Earney Stoutenburg et al.; and U.S. patent application Ser. No. 10/116,735, entitled "Systems and Methods for Configuring a Point-of-Sale System," filed Apr. 3, 2002 by Earney Stoutenburg. It should be understood that "POS device" is a term of convenience and can also refer to any terminal/reader that interacts with any presentation instrument, such as a presentation instrument used as a device to gain access to a premises, such as a secure facility.

A "POS processing system" and/or "merchant system" refers to a computational system used by merchants to control communications between POS devices and payment networks. Such systems may be run internally by merchants, may be run by merchant consortia, or may be outsourced to service providers in different embodiments. Some exemplary POS processing systems which may be adapted to operate with embodiments of the present invention are described in commonly assigned U.S. Pat. Nos. 6,886,742, 6,827,260 and 7,086,584, the complete disclosures of which are herein incorporated by reference.

The terms "real time" or "near real time" are used herein to refer to a process or action that occurs within a relatively short time. Importantly, the terms real time and near real time are not intended to imply an immediate or instantaneous result or action. Rather, the terms are used to refer to process or actions that can be performed relatively quickly such as within several seconds or minutes.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment, it being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination corresponds to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the present invention provide methods, systems, and machine-readable media for handling information related to a financial or other transaction, and/or processing such transactions, including utilizing an expanded application ID for applications that manage the flow of data between a presentation instrument device (e.g., a mobile device used a presentation instrument or financial card) and a terminal/reader (e.g., point-of-sale device) where the transaction is conducted. In some embodiments, the application ID permits application IDs to be assigned based on not only the provider of the application (e.g., the provider may be a payment processor that provides the application to a card issuer and to POS terminals used for processing transactions), but also based on the issuer and the type of account for which the application will be used.

Other embodiments of the present invention provide methods, systems, and machine-readable media for handling information related to a financial transaction and/or processing such transactions including the use of a dynamic Primary Account Number (PAN) that can be generated utilizing a unique encryption key per card or other device. Generally speaking, a card (e.g., a smart card) or other device adapted for use as a payment instrument can be encoded with the real PAN and a unique, card-level key. An application (executed by a processor) within the card or device can dynamically, i.e., for each transaction, encrypt the real PAN using the card-level key and one or more factors from the payment device or the POS reader such as unpredictable numbers or counters as will be described in detail below. That is, based on the real PAN and the unique, card-level key, the card or device can generate a dynamic PAN for the transaction. This dynamic PAN can then be used in the transaction instead of the real PAN. For example, the dynamic PAN can be provided to a merchant system, e.g., via a POS device, to pay for a purchase or to initiate a transaction. The dynamic PAN can then be submitted to a payment processor and/or financial institution via a payment network for approval and/or processing of the transaction. According to one embodiment, a portion of the real PAN can be retained and used "in the clear" as part of the dynamic PAN or otherwise as part of the transaction. For example, a portion of the real PAN used for routing of the transaction can be maintained in the clear, i.e., unencrypted, so that the transaction can be properly routed through the payment network or other network. According to another embodiment, the right-most four digits of the real PAN can be retained and re-used as the last four digits of the dynamic PAN, thereby allowing the truncated PAN on the printed receipt to look the same to the customer. According to another embodiment, the dynamic PAN can be constructed with a new prefix of 6 or more left-most digits, such that routing of the transactions using this new prefix results in the transaction being delivered to a payment processor with the keys and capability to decrypt the dynamic PAN to the real PAN.

Stated another way, some embodiments of the present invention are directed to methods, systems, and machine-readable media for handling information related to a financial transaction including utilizing a set of dynamic cryptograms that are valid for a single transaction. According to one embodiment, a method of processing a financial transaction related to a financial account can comprise detecting initiation of the transaction with a device used as a presentation instrument in the transaction. A Dynamic Transaction Cryptogram (DTC) can be generated at the device. A dynamic PAN can also be generated at the device. The dynamic PAN can comprise an encrypted form of a real PAN of the financial account that is valid for a single transaction. Generating the dynamic PAN can be based on the real PAN, an Institution Key Card Variant (IKCV) stored on the device. The IKCV can be derived from the institution key of the issuer of the account. The dynamic PAN can also be based on an undeterminable number generated or received by the device. Generating the dynamic PAN can further comprise reading the real PAN from a memory of the device, generating Pseudo-PAN-Dynamic-Data (PPDD) representing the real PAN by combining the real PAN with the undeterminable number, and encrypting the PPDD using the card-level key. In some cases, an unencrypted portion of the real PAN can be included as part of the dynamic PAN. For example, the portion of the real PAN can comprise less than all of the real PAN and can include information for routing of the transaction to a financial institution. According to another embodiment, the right-most four digits of the real PAN can be retained and re-used as the last four digits of the dynamic PAN, thereby allowing the truncated PAN on the printed receipt to look the same to the customer. According to another embodiment, the dynamic PAN can be constructed with a new prefix of 6 or more left-most digits, such that routing of the transactions using this new prefix results in the transaction being delivered to a payment processor with the keys and capability to decrypt the dynamic PAN to the real PAN.

The DTC and the dynamic PAN can be provided by the device for use in the transaction. For example, providing the DTC and the dynamic PAN from the device for use in the transaction can comprise providing the dynamic PAN to a Point-of-Sale (POS) device. In such cases, the DTC and the dynamic PAN can be sent or provided from the POS device to a payment processor system. The real PAN of the financial account can then be determined at the payment processor system. The transaction can be authenticated based on the DTC at the payment processor system or at the financial institution. For example, determining the real PAN can comprise decrypting the dynamic PAN using a key maintained by the payment processor system and corresponding to the card-level key of the device. The real PAN can then be sent from the payment processor system to a financial institution to affect processing of the transaction.

It should be noted that, while described herein with reference to implementations utilizing a smart card, embodiments of the present invention are not limited to smart cards or any other particular payment instrument or form factor. Rather, embodiments of the present invention can be implemented using a smart card, mobile device including but not limited to a PDA, smart phone, cell phone, etc., or any other device adapted to perform the processes described herein. Furthermore, embodiments of the present invention are not limited to contactless transactions, i.e., transactions utilizing RFID or other Near-Field Communication (NFC) transmissions between the card or other device and a reader. Rather, various types of contact-based transmissions between the card or other device and a reader are considered to be within the scope of the present invention. Embodiments of the present invention are also not limited to any particular payment type or network or account. In some embodiments, transactions are conducted in relation to financial accounts such as checking accounts, savings accounts, debit card accounts, credit card accounts, and stored value accounts. However, embodiments of the present invention are not limited to payment transactions or financial transactions. Rather, other types of transactions such as requesting refunds, checking account balances, initiating transfers, and accessing loyalty award accounts (e.g., accounts in which points are awarded and accumulated based on a consumer doing business with an airline, merchant or other business) are also considered to be within the scope of the present invention. Further, the term transaction is used in its broadest sense, and includes actions such as using a presentation instrument to access a premises (e.g., a secure facility). Other implementations and variations on the embodiments described herein are also contemplated and considered to be within the scope of the present invention. Additional details of various exemplary embodiments of the present invention will be described below with reference to the figures.

FIG. 1 is a block diagram illustrating an exemplary environment in which embodiments of the present invention may be implemented. In this example, the system can include one or more server computers 105, 110, 115 which can be general purpose computers and/or specialized server computers (including, merely by way of example, PC servers, UNIX servers, mid-range servers, mainframe computers rack-mounted servers, etc.). One or more of the servers may be dedicated to running applications, such as a business application, a web server, application server, etc. Such servers may be used to execute a plurality of processes related to financial transactions of one or more consumers on behalf of one or more client financial institutions. For example, one or more of the servers 105, 110, 115 may execute one or more processes for recording transactions on a credit card issued to the consumer by the financial institution. Other processes may provide for paying a merchant for the consumer's purchase, billing the consumer, etc. The applications can also include any number of applications for controlling access to resources of the servers 105, 110, 115.

In some embodiments, the system 100 may also include a network 120. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system 100 can include one or more user computers which may be used to operate a client, whether a dedicated application, web browser, etc. For example, the user computers can include a client system 125 operated by a client financial institution, a customer system 130 operated by a customer or consumer, a merchant system 135 operated by a merchant or vendor, etc. The user computers 125, 130, 135 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 125, 130, 135 may also have any of a variety of applications, including one or more development systems, database client and/or server applications, and web browser applications. Alternatively, the user computers 125, 130, 135 may be any other electronic device, such as a thin-client computer, Internet-enabled mobile telephone, and/or personal digital assistant, capable of communicating via a network (e.g., the network 120 described below) and/or displaying and navigating web pages or other types of electronic documents. Although the exemplary system 100 is shown with three user computers, any number of user computers may be supported.

The system 100 may also include one or more databases or repositories of enabling data 145. The database(s) of enabling data 145 may reside in a variety of locations. By way of example, a database 145 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 145 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 145 may be a relational database that is adapted to store, update, and retrieve data in response to SQL-formatted commands. The repository of enabling data 145 can include a wide variety of information related to financial transactions related to the consumer and/or specified by different entities such as merchants, financial institutions, third-party advertisers, etc. For example, the enabling data 145 can include a set of keys, i.e., private keys held by the payment processor and/or financial institution and relating to the card-level keys of the individual cards, and that can be used to decrypt the dynamic PAN to determine the real PAN for a transaction as will be described further below.

Figure 2:
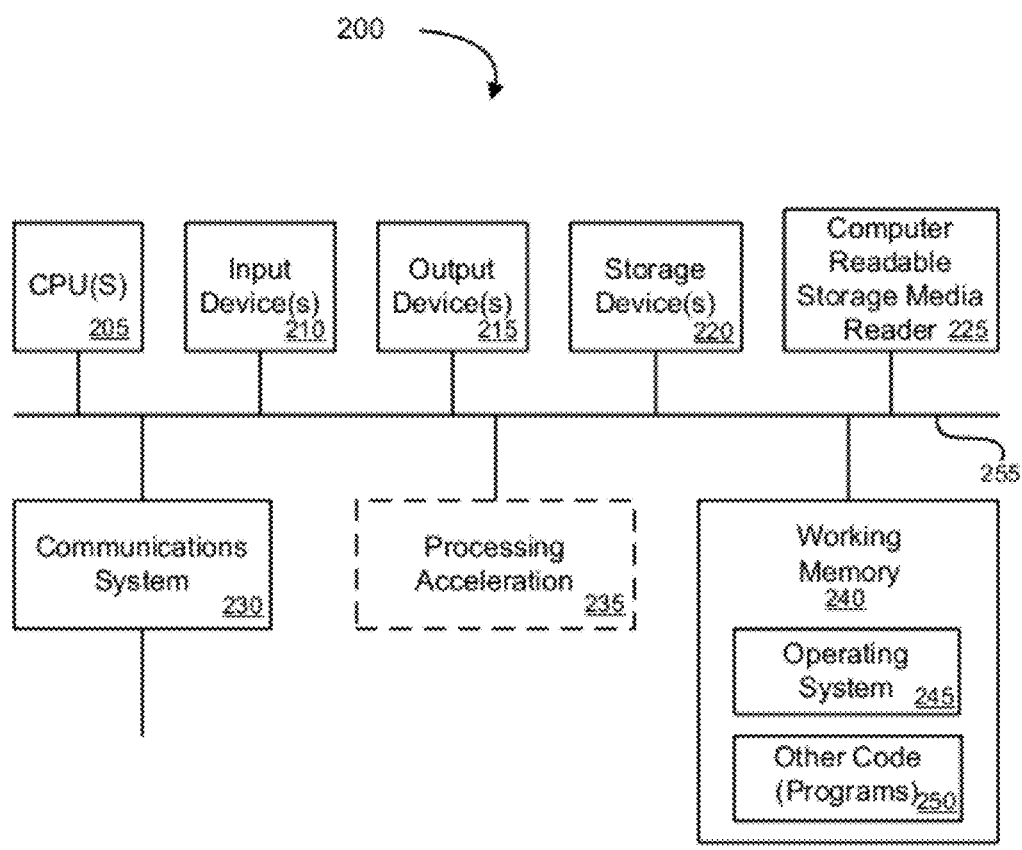
FIG. 2 is a block diagram illustrating an exemplary computer system upon which embodiments of the present invention may be implemented.

FIG. 2 is a block diagram illustrating an exemplary computer system upon which various elements of the exemplary environment illustrated in FIG. 1 may be implemented. The computer system 200 is shown comprising hardware elements that may be electrically coupled via a bus 255. The hardware elements may include one or more central processing units (CPUs) 205; one or more input devices 210 (e.g., a scan device, a mouse, a keyboard, etc.); and one or more output devices 215 (e.g., a display device, a printer, etc.). The computer system 200 may also include one or more storage devices 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225; a communications system 230 (e.g., a modem, a network card (wireless or wired), an infra-red communication device, etc.); and working memory 240, which may include RAM and ROM devices as described above communicatively coupled with and readable by CPU(s) 205. In some embodiments, the computer system 200 may also include a processing acceleration unit 235, which can include a DSP, a special-purpose processor and/or the like.

The computer-readable storage media reader 225 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with a network and/or any other computer or other type of device.

The computer system 200 may also comprise software elements, shown as being currently located within a working memory 240, including an operating system 245 and/or other code 250, such as an application program. The application programs may implement the methods of the invention as described herein. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Figure 3:
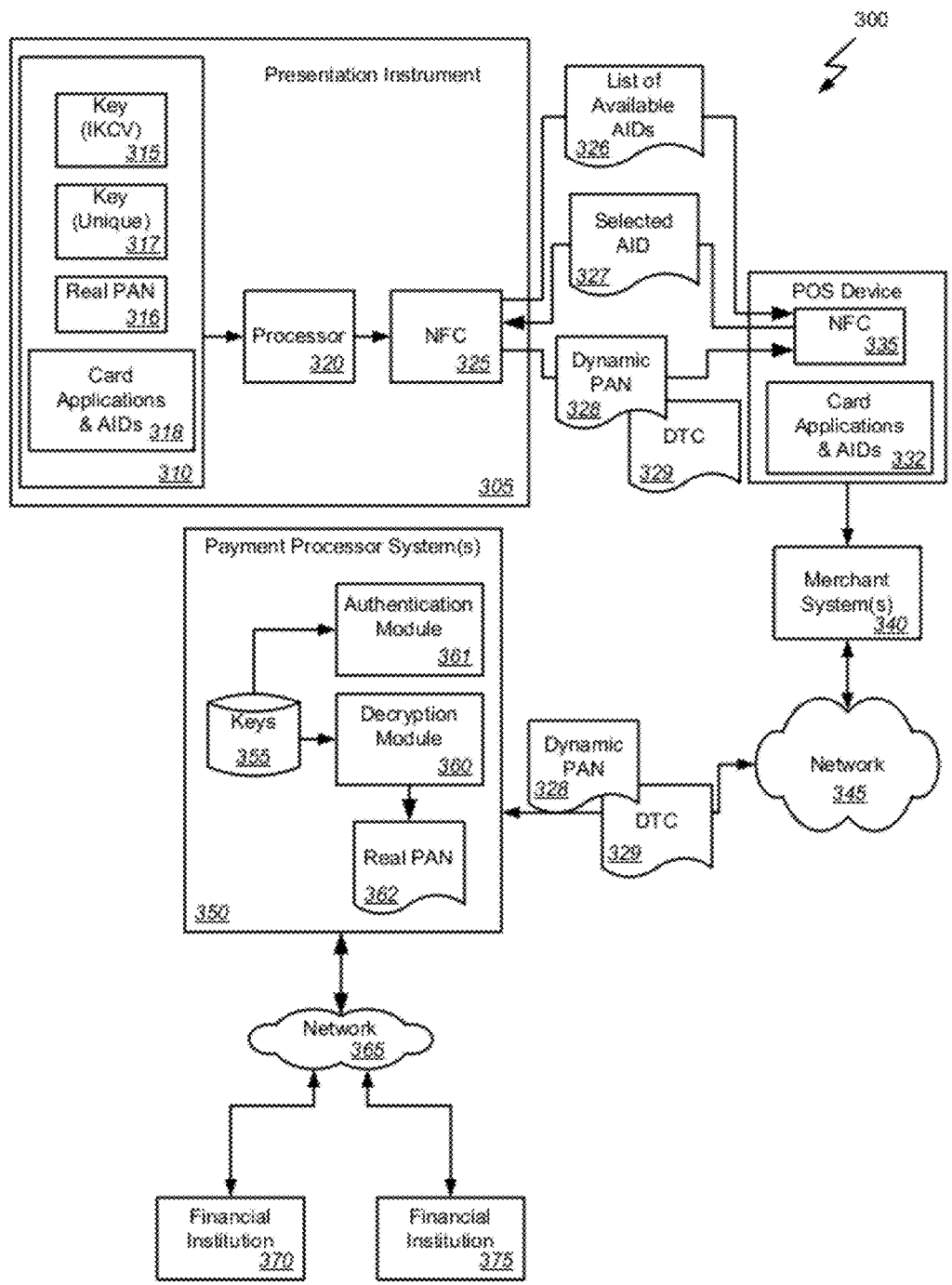
FIG. 3 is a block diagram illustrating, at a high level, a system for processing a financial transaction utilizing applications and dynamic cryptograms according to one embodiment of the present invention.

FIG. 3 is a block diagram illustrating, at a high level, a system for processing a financial transaction utilizing application IDs and dynamic cryptograms according to one embodiment of the present invention. In this example, the system 300 includes a presentation instrument 305, a POS device 330, a merchant system 340 and a network 345 such as a payment network. A payment processor system 350 can also be coupled with the network 345. The payment processor system 350 can also be coupled with one or more financial institutions 370 and 375 via a network 365. It should be understood that, while illustrated here as separate networks 345 and 365, the payment processor system 350 can be coupled with the merchant system 340 and financial institutions 370 and 375 by the same network. Generally speaking and as will be described in greater detail below, an entity such as a consumer can use the presentation instrument 305 to initiate a transaction at the POS device 330, for example by scanning or tapping the presentation instrument 305 on or near the POS device 330 at the time of payment for a purchase. The POS device 330, for example via NFC modules 325 and 335 in the presentation instrument 305 and POS device 330 respectively, can read information from the presentation instrument 305 (with the NFC module 335 at the POS device serving as a reader). This information can be passed from the POS device 330 and/or merchant system 340 via the network 345 to the payment processor system 350 for approval and/or processing of the transaction. For example, the payment processor system 350 can request approval of the transaction via one or more of the financial institutions 370 and 375 and return an approval or denial response to the merchant system 340 and/or POS device 330.

Traditionally, a credit card may be issued to a customer by a financial institution such as a bank and typically displays a logo for an association that implements rules that govern aspects of use of the card. Account information is usually printed on the face of the card, specifying an account number and name of an authorized holder of the card; this information is also stored together with additional information on a magnetic stripe that is usually affixed to the back of the card. In other cases, other types of instruments in other form factors can be used in place of the traditional credit card and can store an account number for an account associated with the instrument and made available through a magnetic stripe or other medium.

According to embodiments of the present invention, rather than a traditional credit card, presentation instrument 305 can comprise a smart card, mobile device, or any other device capable of performing the functions described below. As illustrated here, the presentation instrument 305 includes a memory 310, a processor 320, and an NFC module 325 or other communication module. The memory 310 includes a variant of the institution key of the issuer of the instrument. That is, the institution key card variant (IKCV) 315 can be generated for the presentation instrument 305 by the payment processor system 350, financial institution 370 or 375 or other issuer of the instrument at the time of issuance and based on but distinct from an institution key for that issuer. Details of an exemplary process for generating the IKCV 315 are described below with reference to FIG. 7. The memory 310 of the presentation instrument 305 can also have stored therein a unique card-level key 317 and the real PAN 316 for the account associated with the presentation instrument 305. As with the IKCV 315, the unique card-level key 317 and real PAN 316 can be stored in the memory 310 of the presentation instrument 305 at the time the presentation instrument 305 is issued by the payment processor system 350, financial institution 370 or 375 or other issuer.

As illustrated in FIG. 3, memory 310 also stores instrument or card applications 318 that, when executed, define and control the nature of the transaction data that passes between the presentation instrument 305 and the POS device 330. Such applications are generally known, and will be described further below. Associated with each card application in memory 310 is an application ID, one embodiment of which will also be described further. POS device 330 also stores card applications (and associated application IDs) that may correspond to the card applications stored at the presentation instrument 305, and that likewise define and control the nature of the transaction data passing between the presentation instrument 305 and the POS device 330.

Card applications, such as applications 318 and 332, permit the presentation instrument and POS device 330 to properly transmit to and receive data from each other. The applications will vary depending on the nature of the account involved. As an example, in a typical credit card transaction, the applications 318 and 332 that are used in conjunction with that credit card account define the data (and its format) that needs to be transmitted from the presentation instrument in order to complete the credit card transaction. Such data might include track-1 and track-2 data from the presentation instrument and transaction data such as transaction amount, and so forth. As should be understood, different card issuers may have varying data or varying formats for that data, and thus among other things, the applications 332 at the POS device set up the POS device reader to accept that data from the presentation instrument in proper sequence and format. As another example, in a debit card transaction, the application corresponding to the debit card account likewise defines the data that has to be transmitted between the presentation instrument and the POS device, but in contrast to a credit card transaction, PIN data is likely also to be sent from the presentation device (or from a key pad associated with the presentation device or at the POS device), and the POS device will know (from the corresponding card application) when and in what form it will receive the PIN.

Other environments or transactions involving presentation instrument (beyond financial transactions) also have transaction/user data defined and controlled by corresponding application. For example, in some instances a presentation instrument (e.g., a contactless card) might be used to gain access to a premises, such as a secure facility. In this example, the card application will establish the track data (and its format) that will come from the card, and also perhaps the format (and timing) of pass codes that will be entered by a user (such as a pass code that might need to be entered by a user in addition to data provided by the presentation instrument 305) in order to gain access to the premises.

In summary, the applications 318 and 332 permit the presentation instrument and the POS terminal to each know what data will be sent between the presentation instrument 305 and POS device 330, and the format and timing of that data.

In general, when the cardholder wishes to execute a transaction, such as in an embodiment involving a financial transaction for the purchase of goods and/or services, the cardholder presents the presentation instrument 305 to a clerk at a merchant location, and/or passes or taps the presentation instrument 305 on or near the point-of-sale (POS) device 330. The POS device 330 may have been provided by a payment processor, which acts as an intermediary between merchants and the issuer financial institutions, coordinates transaction routing, and performs a variety of backend processes. The payment processor may have also loaded onto POS device 330 the applications for those cards and accounts that it has the ability to process (as well as provided the applications to the card issuer to load onto the card or presentation instrument for the same accounts). Passing or tapping the presentation instrument near the POS device 330 causes the presentation instrument and the POS device to recognize the presence of each other during an initialization process, and then triggers the POS device to request that the presentation instrument 305 provide a list of the card applications 318 stored in memory 310. It should be appreciated that in some cases, e.g. a smart card, there may only be a single account for which the card is being used and only a single application 318 will reside on the card (and only a single application ID will be provided to the POS device). In other cases, such as where the presentation instrument is a mobile device (such as envisioned in the embodiment to be described shortly), there may be multiple accounts for which the mobile device may be used and thus multiple applications are stored in memory 310, and a list of multiple application IDs will be provided to the POS device.

The list of available application IDs (AIDs) 326 are sent to from the presentation instrument 305 are used by the POS device 330 to determine whether it has the same applications as the presentation instrument and, thus, whether it can process the transaction.

If a list of AIDs are sent to the POS device, one of the AIDs is selected by the POS device (corresponding to an application resident at and selected by the POS device), and the selected AID 327 is sent to the presentation instrument. The presentation instrument then begins to transmit data as is defined by that application. In some cases, it may be possible to process a transaction through any one of several different payment processors or networks, and in such case the POS device 330 may programmed to select the payment processor (and application) that is preferred for that transaction.

In some instances, when a presentation instrument provides only a single card application ID (such as one for an account selected by the user), the POS device 330 would not select the application, but rather only indicates ("yes" or "no") whether it has a corresponding application that permits it to process the transaction. For example, if the user of a mobile device selects one of several possible accounts for a transaction, and the POS device 330 cannot process transactions for that account (it has no corresponding card application for the account type), it would so indicate as part of the process and the user would need to select a different account (or use a different presentation instrument).

After the card application had been selected, the processor 320 is triggered to transmit account information (such as a PAN) to the POS device 330 (under the control of the selected application).

In one embodiment where a dynamic PAN is used in lieu of a real PAN, the processor 320 (under the control of the selected application) is also triggered to read the IKCV 315, the unique card-level key 317 and real PAN 316 from memory 310. Based on this information, the processor can encrypt the real PAN 316 using the IKCV 315 and one or more factors from the payment device or the POS reader such as unpredictable numbers or counters, e.g., a time of day etc., to generate a dynamic PAN 328. The dynamic PAN 328 can be considered a dynamic, i.e., good for one use, cryptogram that represents but hides the real PAN 316. Details of an exemplary process for generating a dynamic PAN 328 are described below with reference to FIG. 5. The processor 320 can also generate a dynamic transaction cryptogram (DTC) 329 based on the unique card-level key 317 and perhaps other information such as a Personal Identification Number (PIN) provided by the consumer. Details of an exemplary process for generating a DTC 329 are described below with reference to FIG. 6. The dynamic PAN can be provided to the merchant system 340, e.g., via the NFC module 325 of the presentation instrument and corresponding NFC module 335 of the POS device 330. The dynamic PAN 328 and DTC 329 can then be submitted to the payment processor system 350 and/or financial institution 370 and 375 via the payment network 345 for approval and/or processing of the transaction.

According to one embodiment, the payment processor system 350 can maintain a key repository 355. The key repository 355 can store a key corresponding to each card-level key 317 for any number of presentation instruments 305. Generally speaking the key of the key repository 355 corresponding to the card-level key 317 of the presentation instrument 305 allows authentication module 361 to authenticate the presentation instrument 305 and/or the consumer using the presentation instrument 305 based on the received DTC 327. The decryption module 360 of the payment processor system 350 can decrypt the dynamic PAN 326 using the institution key for the issuer of the instrument and determine the real PAN 362 of the account associated with the presentation instrument 305. Once the real PAN 362 is determined, the payment processor system 350 can process the transaction, for example, by sending an authorization request, via financial network 365, to the issuing financial institution 370 or 375. The key repository of unique card level keys can be kept at the payment processor or at the financial institution, correspondingly the DTC authentication can be done at the payment processor or at the Financial Institution.

According to one embodiment, transaction requests, e.g., from the POS device 330 and/or merchant system 340 to the payment processor system 350, can convey card number and verification information using "Track-1" of a communication including a "Track 1" and a "Track 2". An exemplary layout of Track-1 can be as follows:

| Field | Length | Description |
|---|---|---|
| Start Sentinel | 1 | "%" |
| Format Code | 1 | "B" |
| Pseudo-Pan | 13 to 19 | Dynamic Pan |
| Field Separator | 1 | "^" |
| Name-Field | 8 | Constant value |
| Field Separator | 1 | "^" |
| Expiration date | 4 | YYMM |
| Service Code | 3 | |
| Data Format | 1 | Contains 0. Reserved for future use. |
| Unpredictable number | 4 | |
| DTC | 6 | |
| ATC | 4 | |
| Card/Chip Sequence Number | 2 | |
| Member Number | 2 | |
| Key-Id | 6 | KEY-ID |
| Dynamic-Pan-Extension | 14-20 | If PAN length is less than 19, Dynamic-PAN-extension has one additional byte for each byte less than 19 of the PAN length. In the example, if PAN length is 16, dynamic-pan-extension should be 14 + (19 − 16) = 14 + = 17. |
| End Sentinel | 1 | "?" |
| Longitudinal Redundancy Check (LRC) | 1 | " "(Hex 20) |
| Total | 79 | |

An exemplary layout of Track-2 can be as follows:

| Field | Length | Description |
|---|---|---|
| Start Sentinel | 1 | ";" |
| Dynamic PAN | 13 to 19 | Same length as Real PAN |
| Field Separator | 1 | "=" |
| Expiration date | 4 | YYMM |
| Service Code | 3 | |
| PIN Offset | 4 | |
| Additional Discretionary Data | 5 to 11 | |
| End Sentinel | 1 | "?" |
| Longitudinal Redundancy Check | 1 | " " (Hex 20) |
| Total | 39 | |

According to one embodiment, the payment processor system 350 can receive Track-1 and Track-2 in an in-bound message from the POS device 330 and/or merchant system 340. The payment processor system 350 can decrypt the Dynamic PAN to determine the real PAN. The payment processor system 350 can then replace the dynamic PAN in Track-2 with the real PAN before forwarding the message to the issuer. The transaction can be authorized or denied depending on such factors as the validity of the cardholder name, the validity of the card number, the level of available credit in comparison with the transaction amount, and the like as known in the art. If authorized, an authorization code can be routed back from the financial institution 370 through the payment processor system 350 to the originating merchant system 340 and/or POS device 330 so that the transaction may be completed.

Stated another way, a device for initiating a financial transaction related to a financial account, such as presentation instrument 305, can comprise a processor 320, an output device such as NFC module 325 communicatively coupled with the processor 320, and a memory 310 communicatively coupled with and readable by the processor 320. The memory 310 can have stored therein a real Primary Account Number (PAN) 316 for the financial account, a unique, card-level key 317, and an Institution Key Card Variant (IKCV) that is a variant of an institution key of an issuer of the financial account. The memory 310 can also have stored therein a series of instructions, i.e., an application (not shown here) which, when executed by the processor 320, causes the processor 320 to detect initiation of the transaction, provide a list of application IDs (one of which is selected by the POS device 330) and, using the selected application, generate a DTC 329 using the card-level key 317, and then generate a dynamic PAN 328 based on the real PAN 316, the card-level key 315, and one or more factors from the payment device or the POS reader such as unpredictable numbers or counters. For example, an undeterminable number can be a time of day, random number, ATC, or other number generated by the presentation instrument 305 or received by the presentation instrument 305, for example from the POS device 330 via the NFC modules 325 and 335. Additional details of an exemplary process for generating a dynamic PAN are described below with reference to FIG. 5. According to one embodiment, generating the DTC can also be based on information known by the owner of the presentation instrument 305, e.g., a PIN or other identifying information. Additional details of an exemplary process for generating a DTC are described below with reference to FIG. 6. The device can then provide the DTC 329 and the dynamic PAN 328 to the NFC module 325 or other output device.

The system 300 can also include a payment processor system 350 communicatively coupled with the device (i.e., the presentation instrument 305) and adapted to receive the DTC 327 and the dynamic PAN 328 from the device and process the transaction. The payment processor system 350 can be adapted to authenticate the transaction based on the DTC 329 and determine the real PAN of the financial account based on the dynamic PAN. For example, the payment processor system 350 can maintain an institution key for the issuer of the account related to the presentation instrument 305, e.g., in key repository 355, and can determine the real PAN by decrypting the dynamic PAN, e.g., via decryption module 360, using the institution key of the issuer. The payment processor system 350 can be further adapted to then submit the real PAN to a financial institution to affect processing of the transaction.

Referring briefly to FIG. 8, there is illustrated an exemplary format of an application ID in accordance with one embodiment of the invention. Such an application ID could identify one of the list of available application IDs 326 (sent from the presentation instrument 305 to the POS device 330) and could also identify the selected application ID 327 (sent back from the POS device 330 to the presentation instrument 305), as illustrated in FIG. 3.

In FIG. 8, the application ID is illustrated as having a 5 byte field for an application provider ID, i.e., the ID of the provider/payment processor that provides the application to the POS terminal 330 and to the issuer (for loading onto the presentation instrument 305), as described earlier. The application ID further includes a 2 byte field for an application code used by the provider to identify or distinguish between groups of applications. The "extended" fields of the application ID include a 4 byte issuer code (to identify or designate the issuer of the presentation instrument or card with which the application is used), and a 5 byte account type code that identifies each type of account with which an application may be used by the designated issuer. As should be appreciated, the extended number of fields in the application ID permits a large number of issuers and their account types to be designated (and distinguished from each other).

Figure 4:
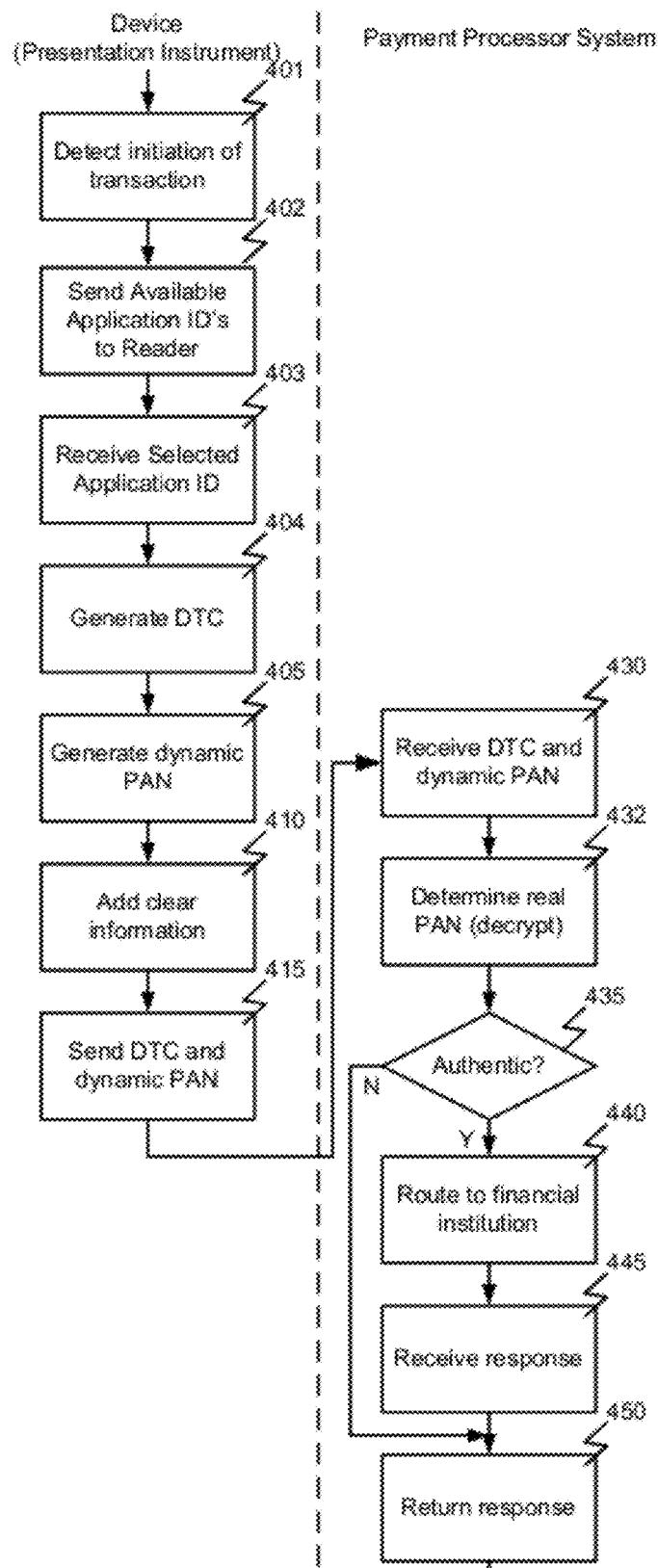
FIG. 4 is a flowchart illustrating processing of a financial transaction utilizing applications and dynamic cryptograms according to one embodiment of the present invention.

FIG. 4 is a flowchart illustrating processing of a financial transaction utilizing application IDs and dynamic cryptograms according to one embodiment of the present invention. In this example, processing begins with detecting 401 initiation of the transaction with a device used as a presentation instrument (e.g., presentation instrument 305 in FIG. 3) in the transaction. A list of the available applications (identified by application IDs) resident at the device are sent 402 to a reader (e.g., POS device 330 in FIG. 3). The device receives 403 a selected application ID back from the reader, identifying the application to be used for the transaction. A DTC can be generated 404 at the device. As noted above, the DTC can comprise a cryptogram or certificate that is valid for a single transaction and identifies the user of the presentation instrument. Generating 404 the DTC can be based on the unique card-level key described above and may also be based on other information known only to the authorized user of the presentation instrument, e.g., a PIN or other identifying information. Additional details of an exemplary process for generating a DTC are described below with reference to FIG. 6.

A dynamic PAN can also be generated 405 at the device. As noted above, the dynamic PAN can comprise an encrypted form of a real PAN of the financial account that is valid for a single transaction. Generating 405 the dynamic PAN can be based on the real PAN, an IKCV stored in the device, and an undeterminable number generated or received by the device. Additional details of an exemplary process for generating a dynamic PAN are described below with reference to FIG. 5. In some cases, an unencrypted portion of the real PAN, i.e., information "in the clear", can be included as part of or added 410 to the dynamic PAN. For example, the portion of the real PAN can comprise less than all of the real PAN and can include information for routing of the transaction to a financial institution. In another example, the right-most four digits of the real PAN can be retained and re-used as the last four digits of the dynamic PAN, thereby allowing the truncated PAN on the printed receipt to look the same to the customer. In another example, the dynamic PAN can be constructed with a new prefix of 6 or more left-most digits, such that routing of the transactions using this new prefix always results in the transaction being delivered to a payment processor with the keys and capability to decrypt the dynamic PAN to the real PAN. The DTC and dynamic PAN can be provided 415 by the device for use in the transaction. For example, providing 415 the DTC and dynamic PAN from the device for use in the transaction can comprise providing the DTC and dynamic PAN to a Point-of-Sale (POS) device as described above. In such cases, the DTC and dynamic PAN can be sent or provided from the POS device to a payment processor system.

The payment processor system can receive 430 the DTC and dynamic PAN from the device, e.g., from the POS device or merchant system depending upon the implementation. The real PAN of the financial account can then be determined 432 at the payment processor system. For example, determining 432 the real PAN can comprise decrypting the dynamic PAN using an institution key of the issuer of the presentation instrument maintained by the payment processor system and corresponding to the IKCV of the device. The real PAN can then be used to retrieve the card level key for that device and validate the DTC using the unique card level key. If the DTC is authenticated 435, the real PAN can then be sent 440 from the payment processor system to a financial institution to affect processing of the transaction. For example, a payment transaction can be forwarded to the issuing financial institution for approval as known in the art. In such a case or as appropriate to the type of transaction, a response from the financial institution may be received 445 by the payment processor system. Such a response may be forwarded or returned 450 to the POS device or merchant system to indicate approval and/or completion of the transaction.

Figure 5:
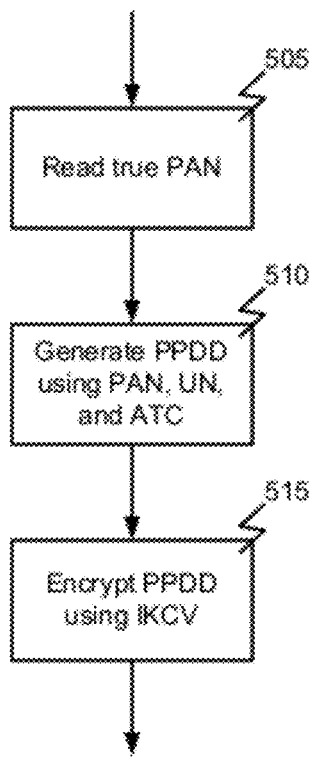
FIG. 5 is a flowchart illustrating an exemplary process for generation of a dynamic primary account number according to one embodiment of the present invention.

FIG. 5 is a flowchart illustrating generation of a dynamic PAN according to one embodiment of the present invention. Generally speaking, generating the dynamic PAN can comprise reading 505 the real PAN from a memory of the device, i.e., the presentation instrument. Pseudo-PAN-Dynamic-Data (PPDD) representing the real PAN can be generated 510 by combining the real PAN with the undeterminable number. The PPDD can then be encrypted 515 using the card-level key.

More specifically, the following example is provided to demonstrate calculation and use of a dynamic PAN as may be performed by a device used as a presentation instrument in a financial transaction according to embodiments of the present invention. In this example and those below, the following names and abbreviations are used:

| Component Name | Initials | Description | How it is used | How it is generated |
| --- | --- | --- | --- | --- |
| Institution Key | IK | The Institution Key can be a key which is private to a financial institution or other issuer | A card-specific variation of the IK (IKCV) can be loaded into the device and can be used for PAN encryption (generating the dynamic PAN). The IK can be part of the formula used by the payment processor system to derive the true PAN from the (encrypted) pseudo-PAN. | A random IK can be system-generated by payment processor when an institution registers for service and requests an IK. When so generated, the key can be assigned a unique KEY-ID. Associated with the IK can also be a randomly generated IKVGEN (IK variant generator) which can be used when generating IKCV values. An encrypted value of IKVGEN can be stored in the database or repository of the payment processor along with the IK itself. |
| KEY-ID | KEY-ID | A designator which identifies an IK in the repository | This id can be inserted into the device, transmitted along with the transaction, and used by payment processor to retrieve the IK when decrypting the true PAN from the dynamic PAN. | KEY-ID values can be assigned sequentially by payment processor when a new IK is requested. |
| Institution-Key-Card-Variant | IKCV | This can be a variant of the IK derived by combining the IK with digits from the PAN and IKVGEN. | The IKCV can be loaded into the device and can be used to encrypt the PAN (generate the dynamic PAN). The IKCV can be used by payment processor to reconstruct the true PAN from the dynamic PAN. | The IKCV can be generated when each card (device) is being customized. Given a card number (PAN) and KEY-ID, payment processor can compute the IKCV. Payment processor can provide a secure online and/or batch interface for institutions requesting IKCV. |
| Card-Key | CK | The Card Key can be a key which is unique per card | The CK can be loaded into the device and can be used by the application in the device to compute the DTC. The CK can be loaded into a file on the payment processor platform, indexed by card number, and used by payment processor to validate DTC. | A random CK can be system-generated by payment processor when an institution requests that a card be added to the service. Payment processor can provide a secure online and/or batch interface for institutions requesting CK. |
| Pseudo-PAN | PP | This can be the card number (PAN) that gets transmitted by the device application to the RFID or NFC reader. It is not a constant value but instead varies with each | The Pseudo-PAN can be sent in place of the real PAN in transmissions between the device and through the network. | The Pseudo-PAN can be computed by the device for each transaction by combining the digits from the card number with the ATC and with the unpredictable number sent by the RFID or NFC reader |

-continued

| Component Name | Initials | Description | How it is used | How it is generated |
|---|---|---|---|---|
| | | transaction. | | and then encrypting these digits with the IKCV. |
| Application Transaction Counter | ATC | This can be a counter which increments for each transaction (message) generated by the card (device) | The most recent ATC received by the payment processor network for each card can be stored in the SCDB database. The ATC for each transaction can be compared to that in the previously received transaction to detect gaps (possible fraud) and duplication (fraudulent replay) | The value at card creation time can be 0000. The application in the card (device) increments the ATC for each transaction and saves the current value in dynamic memory in the device. |
| Unpredictable Number | UN | A random or otherwise undeterminable number. | The device can use the UN in both dynamic PAN and DTC calculations. The payment processor network can use the UN as one factor in reconstructing the true PAN and in validating the DTC. | The UN can be generated by the RFID or NFC reader and transmitted to the application on the device. |
| Dynamic Transaction Cryptogram | DTC | The DTC can be a value which can be computed by the device and validated by the payment processor. | The DTC can be computed by the device and transmitted through the network with the transaction request. Payment processor network can validate the DTC and decline the transaction if the DTC is incorrect. | The DTC can be computed by the device by combining several fields including the PAN, service code, expiration date, unpredictable number, and ATC and encrypting them using the CK. |

An exemplary real PAN that can be used in this example can consist of the following components:

| Component | Number of digits | How it is used |
|---|---|---|
| Prefix (BIN) | Leading digits of the PAN, typically 6 to 10. | Used by networks to route transaction to correct processor for authorization. These prefixes are ISO-assigned. |
| Receipt digits | Last four digits of the PAN | Typically, these last digits are printed on the receipt whereas the remaining digits are blocked. For example, a 16 digit pan may appear as xxxxxxxxxxxx8673 when printed on a receipt. |
| Check digit | Last digit of the PAN | Calculated using Luhn algorithm. The check digit may or may not be validated as it travels through the network. |
| Central digits | These are the other digits in the PAN (between the prefix and the receipt digits) | Size varies with PAN length |

So for example, if PAN=6787650086933734, panlen=16, Prefix=678765, Check digit=4, Receipt digits=3734, and Central digits=008693.

An exemplary pseudo PAN that can be based on this example can consist of the following components:

| Component | Number of digits | How it is used |
|---|---|---|
| Prefix | Leading six digits of the pseudo-pan | This will be a constant ISO-assigned prefix that is used exclusively to create transactions' pseudo-pans and will always be routed to payment processor for decryption of dynamic PAN to real PAN and subsequent routing of the transaction to the Financial Institution. For the purposes of this document, we will assume that the prefix assigned by ISO is 555555. |
| Receipt digits | Last four digits of the pseudo-pan | These are the same as the last four digits of the true PAN. They are conserved so that the last four digits of the receipt have the same digits on a pseudo-pan as they would for a real pan. |
| Pseudo-check-digit | This is a digit within the pseudo-pan and is the digit immediately to the left of the receipt digits, that is, fifth digit counting from the right. | This digit is calculated such that the last digit of the receipt-digits (the check digit) will be correct when the Luhn check-digit algorithm is applied to the pseudo-pan. Start with 0 in this pseudo-check digit. Compute the Luhn algorithm and determine the Luhn total that needs to pass the Mod 10 test. If the Luhn test passes OK, leave the pseudo-check digit as 0. if the Mod 10 test fails, take the Mod 10 remainder and subtract that from 10, that resultant value becomes the pseudo-check digit. This will keep the actual check digit (the right-most digit of the PAN) be the same on the dynamic PAN and the real PAN and allow both PANs to pass the Luhn check. |
| Central digits | These are the other digits in the PAN (between the prefix and the pseudo-check-digit | Size varies with PAN length |

So for example, if Pseudo-pan=5555553834213734, Prefix=555555, Pseudo check digit=1, Receipt digits=3734, and Dynamic central digits=38342.

Based on these assumptions, the dynamic PAN for real PAN 6787650086933734 can be calculated per the following exemplary process:

Take the leading digits (LD) of the true PAN. The length of LD can be PANLEN minus four. In this example, LD is 678765008693. LD-length is 12

Pad LD on the right with 0 to a length of 16 to create LDPAD.

Create a 16-digit LDVAR string left to right as follows:
  Four digit UN
  Four digit ATC
  Four digit UN
  Four digit ATC Interpreting LDPAD and LDVAR as hex digits, perform a hex-to-binary conversion of LDPAD and LDVAR creating two 64-bit variables LDPAD-B and LDVAR-B respectively.

Perform an XOR of LDPAD-B with LDVAR-B resulting in 64-bit pseudo-pan-dynamic-data (PPDD).

Use 3-DES or other algorithm to encrypt the binary PPDD using IKCV resulting in the 64-bit PPDD-cryptogram (EPPDD).

Unpack EPPDD (64-bits) into a 22 digit string of octal digits (0 through 7) called DPPDD as follows. In the description below, each letter can be a bit in the EPPDD. The bits sharing the same letter contribute to the octal digit in DPPDD. The BITS field can be a 64 bit number displayed as four 16-digit components. The OCTAL field can be a 22 byte character string.

a Bits: VtttSSSrrrQQQpppUoooNNNmmmLLLkkkU-jjjIIIhhhGGGfffUeeeDDDcccBBBaaa
  Octal: vutsrqponmlkjihgfedcba
  Process: Build the octal string from right to left. Starting at the most right hand of the four 16-bit components of EPPDD, extract 3 bits at a time right to left creating an octal digit for each 3 bits. Do not use the high order bit of each 16-bit integer during this part of the extraction. After processing the four 16-bit integers, you will have emitted 20 octal digits. Now use the most left hand (sign) bit of the three low order 16-bit integers, right to left, to construct another octal digit and prepend this to the left of the 20 digits already emitted. Finally, take the most left-hand (sign) bit of the first (left-hand) 16-bit integer and prepend the last digit (which will be either zero or one).

Construct the dynamic pan (in this example, 16 digits) by building it left to right as follows:
  SCD Prefix (555555)
  Central digits. These are the last (most right hand) n digits of DPPDD where n=PANLEN−11.
  Pseudo check digit=0.
  Receipt digits=3734 (last four digits of true pan)
  Calculate the LUHN check digit of the dynamic pan. If the check digit (last digit of the receipt digits) is not the correct check digit, adjust the pseudo-check-digit such that the Luhn calculation matches the check digit.
  This adjustment can be made thus: Start with 0 in this pseudo-check digit. Compute the Luhn algorithm and determine the Luhn total that needs to pass the Mod 10 test. If the Luhn test passes OK, leave the pseudo-check digit as 0. if the Mod 10 test fails, take the Mod 10 remainder and subtract that from 10, that resultant value becomes the pseudo-check digit. This will keep the actual check digit (the right-most digit of the PAN) be the same on the dynamic PAN and the real PAN and allow both PANs to pass the Luhn check.

The DPPDD digits that are not used in the dynamic pan central digits can be stored in the Track-1 field dynamic-pan-extension.

Figure 6:
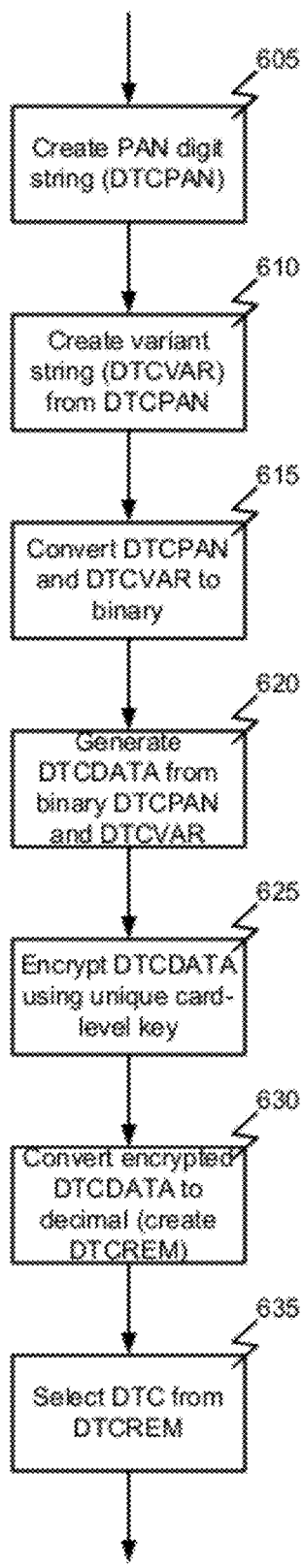
FIG. 6 is a flowchart illustrating an exemplary process for generation of a dynamic transaction cryptogram according to one embodiment of the present invention.

FIG. 6 is a flowchart illustrating an exemplary process for generation of a dynamic transaction cryptogram according to one embodiment of the present invention. In this example, processing begins with creating 605 a PAN digit string. For example, a PAN digit string (DTCPAN) can be created 605 from the most right hand digits of the PAN. If the PAN is longer than a predetermined number of digits, e.g., 16 digits, the PAN can be truncated from the left to reduce the length to the predetermined length. If the PAN is shorter than this length, more digits can be added on the left by repeating additional digits starting on the right side of the PAN.

A variant string (DTCVAR) can be created 610. This variant string can be created, for example, by concatenating the following sequences of characters: UN (4), EXP (4), ATC (4), UN (4). The PAN digit string and variant string can be converted 615 to binary. That is DTCPAN and DTCVAR can be treated as hex characters and converted to binary format (e.g., 64-bit integers). Data, (DTCDATA) can be generated 620 from the binary DTCPAN and DTCVAR. For example, generating 620 DTCDATA can comprise performing a binary XOR of DTCVAR and DTCPAN. The resulting number (DTCDATA) can be encrypted 625 using the CK resulting in EDTCDATA. The encrypted data (EDTCDATA) can be converted 630 to decimal to create a DTCREM string as follows:

Do bit extraction of the right-hand most 3 bits producing a value 0 through 7.
If the fourth-from-right bit is a 1, add 1 to the result.
If the fifth-from-right bit is a 1, add 1 to the result.
Example 1: Byte has binary value 01100101—result is 5.
Example 2: Byte has binary value 01111000—result is 2.
Example 3: Byte has binary value 11111111—result is 9.

The DTC can then be selected 635 from the DTCREM. For example, the DTC can be the right hand (least significant) six digits of DTCREM.

Figure 7:
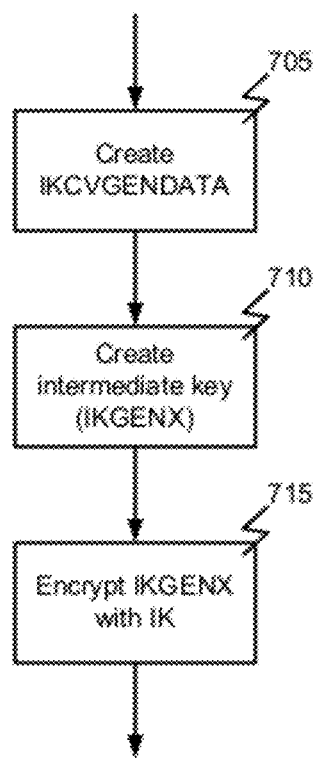
FIG. 7 is a flowchart illustrating an exemplary process for generation of a card variant of an institution key according to one embodiment of the present invention.

FIG. 7 is a flowchart illustrating an exemplary process for generation of a card variant of an institution key according to one embodiment of the present invention. In this example, processing begins with creating 705 key generation data (IKCVGENDATA). Creating IKCVGENDATA can comprise, for example, creating a 16-digit string as follows:

Last four (receipt) digits of the PAN.
Member number (two bytes)
Device Sequence number (two bytes)
Four digit expiration date (YYMM)
Last four (receipt) digits of the PAN An intermediate key (IKVGENX) can be created 710, for example, by performing an XOR of both left and right halves of IKVGEN with IKCVGENDATA. IKVGENX can then be encrypted with the institution key IK resulting in IKCV.

In the foregoing description, for the purposes of illustration, methods were described in a particular order. It should be appreciated that in alternate embodiments, the methods may be performed in a different order than that described. Additionally, the methods may contain additional or fewer steps than described above. It should also be appreciated that the methods described above may be performed by hardware components or may be embodied in sequences of machine-executable instructions, which may be used to cause a machine, such as a general-purpose or special-purpose processor or logic circuits programmed with the instructions, to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for processing a transaction related to an account having an account number, wherein the transaction is conducted with a presentation instrument device (PI device) communicating with a point of sale device (POS device), the method comprising:

detecting initiation of the transaction with the PI device;
providing from the PI device to the POS device a list of one or more application IDs, each application ID identifying an associated application from a plurality of applications, at least one of the applications being stored at both the PI device and the POS device, each application defining types of data and the format of that data that is communicated between the PI device and the POS device for conducting the transaction, each application ID having a structure that includes a provider ID field identifying a payment processor that provides the application for loading onto the PI and the point of sale device, an application code field identifying the application of the payment processor, an issuer code field identifying the issuer of the PI device, and an account type field identifying a type for the account with which the application is used for conducting transactions, all for the purpose of distinguishing the application IDs from one another;
selecting by the POS device an application associated with one of the application IDs provided by the PI device;
receiving at the PI device from the POS device an application ID from the one or more application IDs, the received application ID identifying the application selected by the POS device for the transaction;
initiating communications between the PI device and the POS device using the selected application, including:
generating under the control of the selected application, a Dynamic Transaction Cryptogram (DTC) at the PI device that is valid for a single transaction, the DTC encrypted at the PI device using a unique card key for the PI device and based on personal information known to a user of the PI device and that identifies the user;
generating, under the control of the selected application, a dynamic PAN at the PI device, the dynamic PAN comprising an encrypted form of the real PAN that is valid for the single transaction; and
providing the DTC and the dynamic PAN from the PI device to the POS device for use in the transaction.

2. The method of claim 1, wherein the transaction is a financial transaction and the account is a financial account.

3. The method of claim 2, wherein the type of account identified by the account type field comprises one of a credit card account, debit card account, checking account, savings account, and stored value account.

4. Then method of claim 1, wherein the transaction is a loyalty award transaction and the type of account identified by the account type field is a loyalty award account.

5. The method of claim 1, wherein the PI device is used to gain access to a premises, and the account and account number are assigned to a user for purposes of gaining such access.

6. The method of claim 1, wherein the dynamic PAN provided to the POS device is thereafter decrypted in order to determine the real PAN for processing of the transaction, wherein the determined real PAN is then used to retrieve a key corresponding the card key, and wherein the DTC is provided in order to authenticate the transaction, using the retrieved key.

7. The method of claim 1, wherein generating the dynamic PAN is based on the real PAN, an Institution Key Card Variant (IKCV) that is a variant of an institution key of an issuer of the financial account stored in the device, and an undeterminable number generated or received by the device.

8. The method of claim 7, wherein generating the dynamic PAN further comprises:
reading the real PAN from a memory of the PI device;
generating Pseudo-PAN-Dynamic-Data (PPDD) representing the real PAN by combining the real PAN with the undeterminable number; and
encrypting the PPDD using the IKCV.

9. The method of claim 1, further comprising including an unencrypted portion of the real PAN in the dynamic PAN.

10. The method of claim 9, wherein the portion of the real PAN comprises less than all of the real PAN and includes information for routing of the transaction to a financial institution.

11. The method of claim 9, wherein a right-most four digits of the real PAN are retained and re-used on a printed receipt.

12. The method of claim 1, further comprising providing the DTC and the dynamic PAN from the POS device to a payment processor system.

13. The method of claim 12, further comprising authenticating the transaction at the payment processor system based on the DTC.

14. The method of claim 12, further comprising authenticating the transaction at a financial institution based on the DTC.

15. The method of claim 12, further comprising determining the real PAN of the financial account at the payment processor system.

16. The method of claim 15, wherein determining the real PAN comprises decrypting the dynamic PAN using an institution key of an issuer of the financial account.

17. The method of claim 15, further comprising submitting the real PAN from the payment processor system to a financial institution to affect processing of the transaction.

18. A method for processing a financial transaction related to a financial account having a Primary Account Number (PAN), wherein the transaction is conducted with a device used as a presentation instrument (PI) communicating with a point of sale device (POS device), the method comprising:
detecting initiation of the transaction with the device;
providing from the device to the POS device a list of one or more application IDs, each identifying an associated application, at least one of which being stored at both the PI and the POS device, and that defines types of data and the format of that data that is communicated between the PI and the POS device for conducting the transaction, each application ID having a structure that includes a provider ID field identifying a payment processor that provides the application for loading onto the PI and the POS device an application code field identifying the application of the payment processor, an issuer code field identifying the issuer of the device, and an account type field identifying a type for the financial account with which the application is used for conducting transactions, all for the purpose of distinguishing the application IDs from one another;
selecting by the POS device the application to be used for the transaction;
providing from the POS device the application ID for the selected application to the PI;
managing communications between the device and the POS device using the selected application;
generating, under the control of the selected application, a Dynamic Transaction Cryptogram (DTC) at the device that is valid for a single transaction, the DTC encrypted at the PI device using a unique card key for the PI device and based on personal information known to a user of the PI device and that identifies the user;
generating, under the control of the selected application, a dynamic PAN at the device, the dynamic PAN comprising an encrypted form of the real PAN that is valid for the single transaction; and
providing the DTC and the dynamic PAN from the device to the POS device for use in the transaction.

19. A presentation instrument device (PI device) for initiating with a point-of-sale device (POS device) a transaction related to an account, the presentation instrument device comprising:
a processor;
an output device communicatively coupled with the processor; and
a memory communicatively coupled with and readable by the processor, the memory having stored therein one or more applications and an application ID associated with each of the applications, each application stored at both the PI device and the POS device and defining the types of data and the format of that data that is communicated between the PI device and the POS device, and including a series of instructions which, when executed by the processor, cause the processor to communicate data concerning the transaction between the PI device and the POS device, each application ID having a structure that includes a provider ID field identifying a payment processor that provides the application, an application code field identifying the application of the payment processor, an issuer code field identifying the issuer of the PI device, and an account type field identifying a type for the account with which the application is used for conducting transactions, all for the purpose of distinguishing each application ID from one another;
wherein application IDs are provided by the PI device to the POS device and wherein an application ID is returned to the PI device, the returned application ID corresponding to an application selected by the POS device; and
wherein the series of instructions further cause the processor to:

generate, with the processor, a Dynamic Transaction Cryptogram (DTC) at the PI device that is valid for a single transaction, the DTC encrypted at the device using a card key and based on personal information that is known to a user and that identifies the user;

generate, with the processor, a dynamic PAN at the PI device, the dynamic PAN comprising an encrypted form of the real PAN that is valid for the single transaction; and provide both the DTC and the dynamic PAN from the PI device to the POS device for use in the transaction, wherein the provided dynamic PAN is decrypted in order to determine the real PAN for processing of the transaction, wherein the real PAN that is determined from the provided dynamic PAN is then used to retrieve a key corresponding to the card key, and wherein the DTC is provided in order to authenticate the transaction, using the retrieved key.

20. The system of claim 19, wherein the account is a financial account, wherein the memory has further stored therein a real Primary Account Number (PAN) for the financial account, a unique, card-level key, and an Institution Key Card Variant (IKCV) that is a variant of an institution key of an issuer of the financial account, and wherein each application further includes a series of instructions which, when executed by the processor, cause the processor to detect initiation of the transaction, generate a Dynamic Transaction Cryptogram (DTC) using the unique card-level key, generate a dynamic PAN based on the real PAN, the IKCV, and an undeterminable number, and provide the DTC and the dynamic PAN to the output device.

* * * * *